R. C. CAUGHEY.
PLOW.
APPLICATION FILED AUG. 4, 1913.
1,090,134.  Patented Mar. 17, 1914.
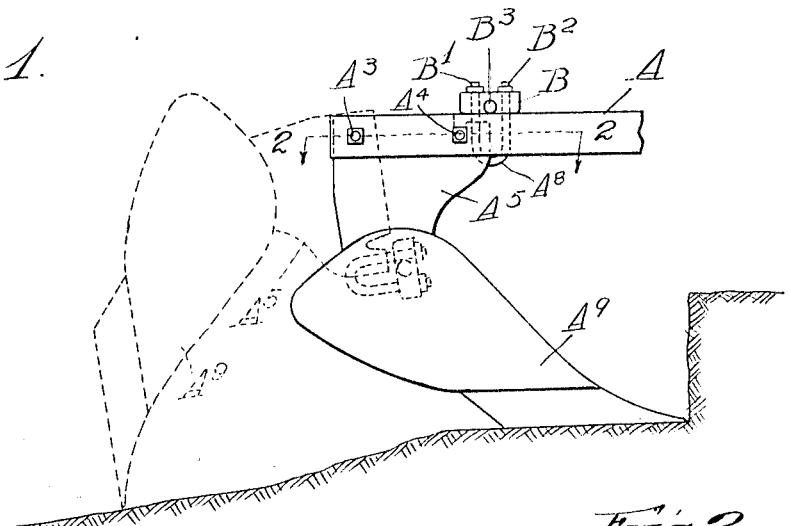
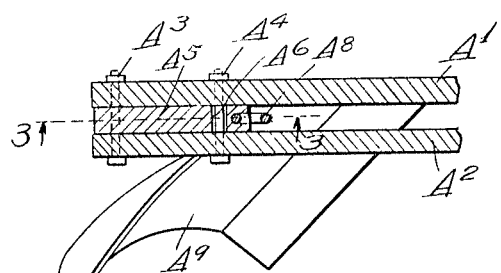
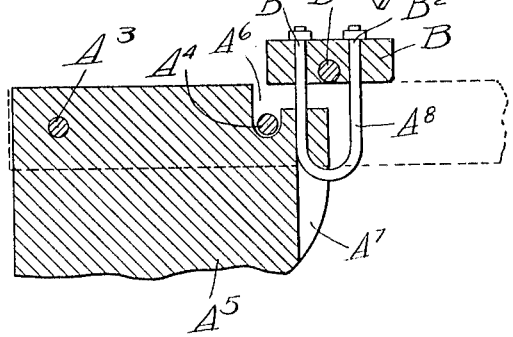
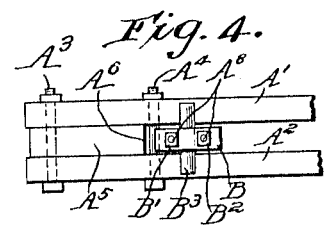
Witnesses:
Inventor
Robert C. Caughey
by Parker & Carter
his attys.

UNITED STATES PATENT OFFICE.

ROBERT C. CAUGHEY, OF DIXON, ILLINOIS, ASSIGNOR TO M. RUMELY COMPANY, OF LAPORTE, INDIANA, A CORPORATION OF INDIANA.

PLOW.

1,090,134.  Specification of Letters Patent.  Patented Mar. 17, 1914.

Original application filed February 17, 1913, Serial No. 748,849. Divided and this application filed August 4, 1913. Serial No. 782,788.

*To all whom it may concern:*

Be it known that I, ROBERT C. CAUGHEY, a citizen of the United States, residing at Dixon, in the county of Lee and State of Illinois, have invented a certain new and useful Improvement in Plows, of which the following is a specification.

My invention relates to improvements in plows and contains the matter shown in my now pending application #748,849, filed February 17, 1913, of which this is a divisional case and has for one object to provide means for automatically releasing the plow when it comes in contact with any movable object or an object of sufficient size or weight or resistance to interfere to too great an extent with the forward movement of the plow. It is illustrated diagrammatically in one form in the accompanying drawing, wherein—

Figure 1 is a side elevation of a plow with parts broken away; Fig. 2 is a section along the line 2—2 of Fig. 1; Fig. 3 is a section along the line 3—3 of Fig. 2. Fig. 4 is a plan view.

Like parts are indicated by the same letter throughout the several figures.

A is a plow beam which would normally be connected to a gang plow frame not here shown which is made up of two parallel spaced beam members $A^1$, $A^2$ held together by the bolts $A^3$, $A^4$.

$A^5$ is a plow frame pivoted on the bolt $A^3$ free to swing on this bolt between the beams $A^1$, $A^2$ slotted at $A^6$ to engage the bolt $A^4$ and apertured at $A^7$ to engage a U-shaped link or yoke $A^8$.

$A^9$ is a plow share rigidly mounted on the frame $A^5$ and held in position thereby.

B is a tie block of metal or other suitable material through which pass both arms of the U-shaped screw threaded link $A^8$ and upon which rests the two nuts $B^1$, $B^2$ which hold the link in position with respect to the block B.

$B^3$ is a release pin of wood or other suitable material passing through the block B projecting outwardly on either side to rest upon the beams $A^1$, $A^2$, the arrangement being such that the ends $B^1$, $B^2$ hold the pin $B^3$, the block B and the frame $A^5$ firmly together, the bottom of the slot $A^6$ being drawn up tight against the bolt $A^4$ to prevent vibration or chattering as the plow is operated.

As long as the resistance encountered by the plow does not become too great or pass a margin of safety, the plow will be drawn through the ground by the forward movement of the plow beam, maintaining its fixed position with respect to the plow beam. However, in case the plow encounters a rock or other movable object and the pressure becomes too great, there will be a force movement tending to rotate the plow and frame about the bolt $A^3$, pulling downwardly on the pin $B^3$, and the pin $B^3$ is so designed that it will give by shearing before the pressure is great enough to cause damage. When this happens the plow and frame will be free to swing loosely about the bolt $A^3$ and will gradually swing into the position shown in dotted lines in Fig. 1.

I claim:

1. The combination with a plow beam of a supporting member pivotally mounted thereon, a plow share rigidly attached to said supporting member, a yoke loosely connected to said supporting member and a breaking member interposed between said yoke and the plow beam, said yoke being adjustable with respect to the plow beam.

2. The combination with a plow beam of a supporting member pivotally mounted thereon, a plow share rigidly attached to said supporting member, a yoke loosely connected to said supporting member and a breaking member interposed between said yoke and the plow beam, said breaking member being removable, said yoke being adjustable with respect to the plow beam.

3. The combination with a plow beam of a plow share rotatably mounted thereon, yielding means for holding said plow share against rotation with respect to said plow beam, means for adjusting the relation between said yielding means, the plow share and the plow beam to compensate for wear of the yielding means, said adjusting means comprising a yoke, a tie block containing the yielding means in engagement with said yoke, the ends of said yoke being screw-threaded, and nuts screw-threaded on the ends of said yoke and in engagement with said tie block.

In testimony whereof, I affix my signature in the presence of two witnesses this 30th day of July, 1913.

ROBERT C. CAUGHEY.

Witnesses:
F. D. STEPHAN,
J. F. HILL.